United States Patent
Skan (10) Patent No.: US 7,698,698 B2
(45) Date of Patent: Apr. 13, 2010

(54) METHOD FOR OVER-THE-AIR FIRMWARE UPDATE OF NAND FLASH MEMORY BASED MOBILE DEVICES

(75) Inventor: Peter L. Skan, Harpenden (GB)

(73) Assignee: Smith Micro Software, Inc., Aliso Viejo, CA (US)

( * ) Notice: Subject to any disclaimer, the term of this patent is extended or adjusted under 35 U.S.C. 154(b) by 1099 days.

(21) Appl. No.: 10/956,247

(22) Filed: Sep. 30, 2004

(65) Prior Publication Data
US 2006/0075284 A1   Apr. 6, 2006

(51) Int. Cl.
G06F 9/44   (2006.01)
(52) U.S. Cl. ........................... 717/168; 717/173
(58) Field of Classification Search .................. None
See application file for complete search history.

(56) References Cited

U.S. PATENT DOCUMENTS

| 6,260,156 | B1 * | 7/2001 | Garvin et al. ............. | 714/8 |
| 2005/0114499 | A1 * | 5/2005 | Monk ....................... | 709/224 |
| 2005/0132179 | A1 * | 6/2005 | Glaum et al. ............. | 713/1 |
| 2005/0246703 | A1 * | 11/2005 | Ahonen ..................... | 717/172 |
| 2007/0043938 | A1 * | 2/2007 | May et al. ................. | 713/2 |

OTHER PUBLICATIONS

Kim et al. A Space-Efficient Flash Translation Layer for Compact Flash Systems, IEEE Transactions on Consumer Electronics, vol. 48 No. 2, pp. 366-375, May 2002, Retrieved on [May 11, 2009].*

* cited by examiner

*Primary Examiner*—Tuan Q Dam
*Assistant Examiner*—Cheneca P Smith
(74) *Attorney, Agent, or Firm*—Smyrski Law Group, A P.C.

(57) ABSTRACT

A method for receiving, storing, and applying an update package to modify an original image stored within non-volatile flash memory devices. More specifically, the present design provides a download agent responsible for communicating with a server to transfer and store the update package; and an update agent responsible for verifying, decompressing and decoding the update package. The present design separates non-essential operating system (OS) components and applications from the core OS, stores non-essential OS components, applications, and download agent as a single image in a read-only file system. This image may be updated by applying an update package created by running a binary differencing engine on two pre-built file system images representing the current and new file systems to modify the stored image. Additionally, the present design applies an update package to the core OS, which includes the update agent.

32 Claims, 5 Drawing Sheets

METHOD FOR OVER-THE-AIR FIRMWARE UPDATE OF NAND FLASH MEMORY BASED MOBILE DEVICES

FIELD OF THE INVENTION

The present invention relates generally to the field of computer systems, and more specifically methods for updating a binary image stored in a non-volatile memory device, such as a NAND flash memory. In particular, but not exclusively, the present invention pertains to the remote update of one or more operating system components or application programs stored in a read only file system held in NAND flash memory of a mobile device.

BACKGROUND OF THE INVENTION

Recent years have seen the rapid advancement and proliferation of electronic devices, which devices often require updating of the resident firmware, operating code, applications or other software loaded thereon, collectively, "binary images", or simply "images". Moreover, installing and updating of such binary images is becoming routine where advancements applicable to a particular device far outpace the rate at which it is desirable to retire the unit and replace it with an entirely new unit.

Moreover, for many devices for which updating the binary image is desirable, these same devices may be remotely located and it is not practical for many reasons to return or collect the device in order that it can be directly connected to a host updating machine or system.

Also, in applying an update to install a new image, it is not uncommon for power loss or other interruptions to the subject device to occur which leads to failure of the installation. This may result in the installation process having to begin again from the start, or worse, leaving a device disabled or wholly inoperable due to a partial install from which it cannot recover or reinitiate. Additionally, with limited memory on the device itself, whether it is a mobile phone, personal digital assistant, pager or any other variety of small form factor portable devices, delivery of an entire new image is often infeasible due to the capacity limitations (e.g. communications bandwidth, available memory, etc.) of the device.

Initially, these mobile devices were developed using NOR flash memory hardware as their storage medium. NOR flash memory enables relatively fast random access to the flash for the purpose of executing code. However, it does not provide rapid write performance. The large erase blocks typically associated with NOR, the overhead required supporting their erasure, and typically lengthy programming times, limit its use for significant data storage applications. Today, NOR flash chips as large as 16 MB are being used to store entire operating system images such as Windows CE. In devices such as basic cellular phones where code size is relatively small or where there's no performance requirement beyond what can be achieved with direct code execution, NOR flash chips have been the undisputed design choice. Further contributing to the success of NOR in these environments is the fact that there's typically no requirement for storing large amounts of data.

Historically, NOR flash memory has been the prevalent storage medium for executable code, such as power-on boot loaders and BIOS software in mobile devices. The relatively fast access times of NOR and the ability to linearly address the flash within a devices memory space suggest it is suitable for storing software applications.

Advances in the design and manufacture of flash memory have produced a second type of flash memory available for use in mobile devices, in addition to NOR flash memory. This second flash memory, known as NAND flash memory, provides a more attractive solution to designers due to its increased capacity and reduced cost. Mobile devices today, leveraging 2.5G and 3G cellular technologies, now require increasing amounts of storage for both data and applications. The desirability to deploy mobile devices based on NOR flash memory is decreasing as new features realized have increase demands for local code and data storage. The design of NAND flash memory emphasizes increased write performance, higher density, and lower cost. Write performance improvements are achieved through a page-oriented management of the flash and smaller sized erase blocks. Use of a smaller flash cell size has allowed NAND memory devices to attain higher densities (i.e. higher storage capacities) than experienced with NOR memory devices. Reductions in cell size, and total device pin count of NAND's input/output interface, have both contributed to yielding a significantly lower manufacturing cost. NAND's write performance however, drastically distances it from NOR. When transferring large amounts of data, particularly data that crosses over erase block boundaries; the disparity tends to be dramatic. This is one of the reasons that NAND has been so successful in digital cameras and other platforms that require disk-like storage.

NAND flash, which has somewhat slower read access times, and a non-linear interface, has typically not been used for storing code (i.e. applications). Instead, it has been deployed as a disk-like repository for application data. Its higher density and superior write performance make it well suited for devices that require large amounts of data storage. Today, however, the traditional use of these flash technologies is being revisited, as computer manufacturers continue to find ways to reduce costs.

With NAND memory priced at less than one half the cost of NOR memory, system designers are pioneering new methods of using NAND for code (i.e. applications and operating system components) as well as data storage. Techniques have been realized that can be used to boot from (i.e. start) and execute code that is stored in NAND flash.

Accordingly there is a need for an efficient, effective and reliable method for receiving, storing, and applying an update to a device utilizing NAND flash memory hardware that does not require the unit to be returned to a service center for update and instead uses an update package that can modify the binary image in-situ, to modify existing software applications or operating system components. And, there exists need for a complimentary mechanism or technique to allow for recovery and continued application of an update to such device, even when being updated remotely and without access to a host update or boot rescue system.

Systems for over-the-air update of firmware on portable devices such as mobile telephones have been designed and deployed for those devices based on NOR technology. In such a system, an update package representing the differences between the original and new firmware images is created and place on a server machine, available for download. A known manner in reducing the size of a new image update, developed for NOR based mobile devices, is to use a differencing algorithm or binary differencing engine that compares the current or existing binary image with the new binary image to produce a list of differences. Such differences, in a general sense, are typically output or expressed as sequences or sets of ADD and COPY operations such that the new image can be created by combining together binary sequences copied from the original image resident on the device (a COPY operation) and interlacing them with binary sequences from the new image (contained within the update package) for which a suitable copy sequence was not available in the original image (an ADD operation).

The ADD operation specifies a list of bytes that must be copied into the new image at the current location, and the COPY operation specifies a number of bytes to be copied from a given location in the original image to the current update location in the new image.

The method developed for reducing the size of a new image update for NOR based devices remains an appropriate mechanism for today's more sophisticated mobile devices employing NAND memory technology.

The present invention addresses the remote update of a mobile device in which the majority of the operating system components and software applications (e.g. email client, micro-browser, calendar, etc.) reside in a read-only file system in NAND flash memory. This invention provides a method to receive, store and apply update packages transferred to the device in a complementary manner to that used for NOR based devices.

This invention addresses the known disadvantages and limitations experienced when using NAND flash memory devices versus NOR flash memory.

Current methods do not typically provide access to the operating system facilities when updating devices in which the firmware resides in conventional NOR type flash memory. The update package must typically be stored in a dedicated area of flash commonly referred to as the workspace. This workspace may also contain state information used by the update agent. Thus, the amount of spare flash memory that can be devoted to the workspace area determines the maximum possible update package size. The update mechanism (i.e. update agent) is normally a small standalone program or is part of the bootstrap code. It is accessed or entered by rebooting the device. Once the device is booted in this configuration, the operating system software, which in fact is modified during the update process, does not execute (i.e. run) and is not available during the updating of the flash firmware. As the update package is decode by the update agent, it then makes use of it's own hardware drivers to reprogram the stored firmware image. This is achieved using a combination of read, copy, erase, and write operations directly to the NOR flash hardware.

Information stored in NOR flash memory is read by accessing the data in a byte-by-byte manner. This allows the operating system of the device to be executed directly from NOR flash using a technique known as execute-in-place. Writing to NOR flash is accomplished by first copying a flash block, followed by erasing the block that was copied, and then writing new data to this block of flash memory. The processing required for this update method should be obvious to one skilled in the art.

However, the update mechanism for NAND flash memory differs from that of NOR based devices. In particular, NAND flash memory hardware devices are not byte addressable as in NOR devices. NAND devices can only be read or written using page-sized units. As a result they do not support execute-in-place techniques, instead they are accessed, similar to a disk, with memory blocks being read into Random Access Memory (RAM) for execution. In addition, NAND flash memory may be delivered with a number of bad blocks present, and it is possible for further blocks to turn bad during operational use. To mitigate this affect, semiconductor manufacturers have developed a bad block manager (BBM) component, typically built into the operating system, to provide a suitable interface for other software to interact reliably with NAND flash memory. A flash translation layer (FTL) is also used, placed between a file system implementation and BBM, to hide block erasure and provide a disk-like sector read/write interface. The manufacturer of the NAND flash hardware device also normally supplies the FTL.

The need therefore is for a method that addresses the different reprogramming operations associated with mobile devices based on NAND memory hardware for storage to support updating current versions of applications and operating system components. In addition, a design that enables a bad block manager to be used when writing to NAND flash memory devices at the block read/write/erase level is desirable. Moreover, a design that enables access to state information, an update package, and a backup block (i.e. similar to the workspace area utilized in NOR flash) through a bad block manager may provide other advantageous qualities over previously know designs.

SUMMARY OF THE INVENTION

The present design provides for an efficient, effective and reliable method for receiving, storing and applying an update to a client device utilizing NAND flash memory hardware as the storage mechanism. In addition, this design provides bad block management facilities, commensurate to that typically built into the operating system, for use during the firmware update process without replicating the bad block manager (BBM) in the boot environment. Specifically, the present design divides the device firmware into two parts (i.e. images) in order to effect bad block management facilities for use when applying the update package. The first part is a minimal core image that contains the essential components of the operating system required during the update process. These components may include firmware device drivers, bad block manager, and file system support. The second image contains all remaining operating system components and any resident application programs. The second part is provided in the form of a read-only file system.

Dividing the firmware in this manner enables the present design to startup by loading the minimal core image into RAM where is executed. For normal operation of the device, a read-only file system (ROFS) contained in the second image is mounted by the core operating system in a manner sufficient to form the complete file system once this minimal core is up and running.

To effect update package processing, this method allows information contained in the ROFS (i.e. operating system components and application programs) to be modified by the update agent prior to being mounted. The present design architecture enables the update agent to run above the core operating system, thus providing access to the bad block manager facilities by use of the normal flash drivers provided within the operating system during the application of an update package.

The present designs architecture provides for easy porting of code to new hardware and storing of update packages, state information, and backup block in files (i.e. content typically stored in the workspace area in previously know designs for NOR flash technology). The advantage in code portability is realized since the download agent and update agent are now operating system application programs; the update agent does not require separate flash drivers or integration with the bootstrap mechanism. Storage of content previously saved in the 'workspace area' using the devices read/write file system affords a potentially larger amount of space available to hold one or more update packages.

Thus, the present invention is able to add new functionality or resolve problems found after deployment of a device, such as a mobile phone, without being recalled by a manufacturer for modification at a service centre. The ability for the device to reliably apply the update itself and allowing the update package to be provided via over-the-air (OTA) delivery removes the costs associated with a major recall.

A typical embodiment of this invention would be for updating of the flash memory image in a mobile phone where the update package has been delivered to the phone OTA and is being applied to the flash memory without the subscriber returning the phone to a service center for update. In this environment the update must complete reliably even though the battery may discharge during the update, or the subscriber may simply turn-off the phone.

Moreover, the present design allows for an update package that can be used to perform an in-situ upgrade of a binary image held in flash memory without use of external re-flashing hardware. Additionally, the present design provides for reliable flash memory updates within devices that do not have a guaranteed power supply, e.g. mobile phones, personal digital assistants, etc., and without recourse to external power supplies or dedicated additional re-flashing hardware.

As will be evident through further understanding of the invention, any client device using non-volatile flash memory to store one or more update packages would potentially benefit from the present invention. This method of receiving, storing, and applying update packages could be applied to any device using conventional block-structured non-volatile memory such as flash memory; i.e., those with limited additional memory for storage of new images prior to update would benefit by requiring only the space for the much smaller update package to be held instead.

BRIEF DESCRIPTIONS OF THE DRAWINGS

The present invention is illustrated by way of example, and not by way of limitation, in the figures of the accompanying drawings in which.

DETAILED DESCRIPTION OF THE INVENTION

Reference will now be made in detail to the preferred embodiments of the invention, examples of which are illustrated in the accompanying drawings and tables. While the invention will be described in conjunction with the preferred embodiments, it will be understood that they are not intended to limit the invention to those embodiments. On the contrary, the invention is intended to cover alternatives, modifications, and equivalents, which may be included within the spirit and scope of the invention as defined by the appended claims.

The present design provides for receiving, storing and applying over-the-air firmware update packages. The present design is described using an exemplary wireless client device architecture employing NAND flash memory hardware as the storage medium.

Although particularly well-suited for updating wireless mobile devices employing NAND flash memory technology, the invention is not limited to use with such types of mobile devices, and is applicable to any type of non-volatile memory that has a requirement for bad block management. Moreover, the same method could be used for convention NOR flash based client devices, provided that the core operating system is stored separately from the rest of the operating system and applications.

Use of the term "client device" or "mobile device" is in no way intended to limit the application of the present invention from use with a much broader class of devices which may be mobile or fixed, and which may be the form of a telephone handset but may also be of any number of other form factors or varieties of devices. As such, the term "client device" as used herein means the broadest description possible of a class of computing devices that can be connected to a network (whether by fixed, wireless, intermittent, removably connected or other connection) and which the updating techniques detailed herein may be applied, which includes, without limitation, mobile handsets, personal digital assistants, pagers, personal computers, printers and other peripheral devices.

The present invention provides for updating operating system components and software application programs stored in a mobile (i.e. portable) device. While the description provided herein is applicable to a mobile device architecture using NAND flash memory as it's storage medium, it is to be understood that the invention is not so limited, and may be employed in other remote portable standalone device architectures, and other storage mediums.

The present design will be illustrated in an exemplary wireless communications system utilizing mobile handsets (i.e. devices) containing flash memory technology; however, the present invention is applicable to any device using a block-structured or partitioned memory device that may need its memory image updated in a reliable way when working in a standalone configuration, and which is perhaps also possible not to have any guarantee that power to the device will not be interrupted during the update.

Accordingly, the disclosed updating techniques may be used in any number or type or combination of client devices having block-structured non-volatile memory devices in which it is desirable to employ bad block management techniques. As used herein "stored" "saved" "reprogrammed" and similar terms all refer to the same process of storing a binary image in a memory device in accordance with the techniques for storing associated with the particular memory device, whether it be non-volatile flash memory, volatile RAM or otherwise, unless specifically described otherwise.

Figure 1:
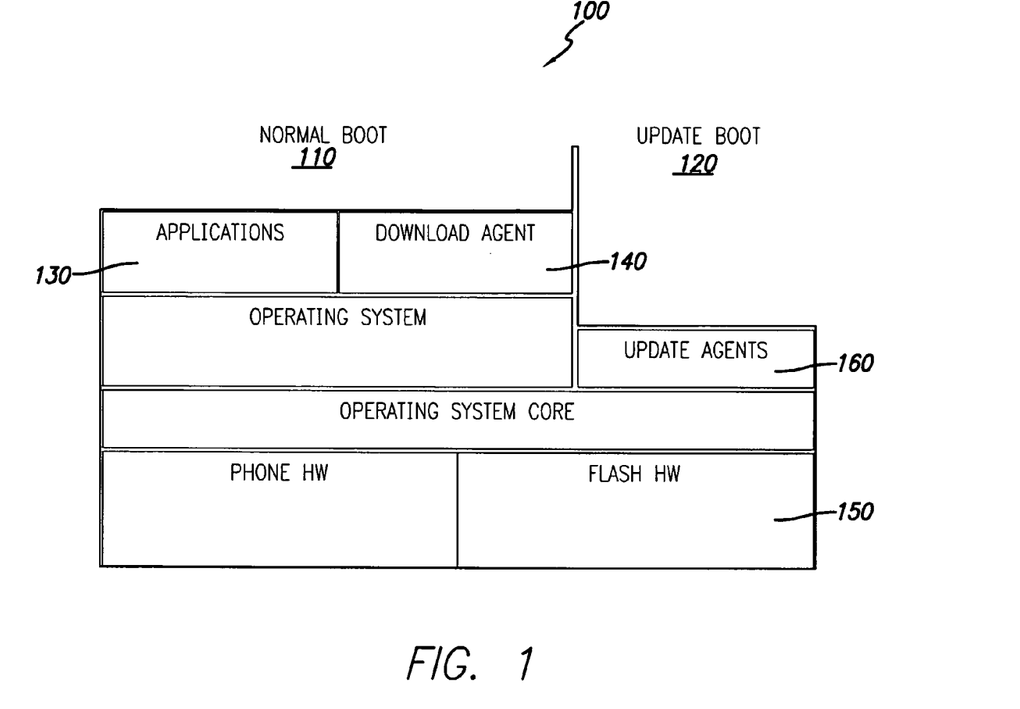
FIG. 1 is a schematic illustration of an update client architecture for NAND flash based devices.

An exemplary wireless mobile device update client architecture 100 for NAND flash memory hardware based mobile devices is shown in FIG. 1 in accordance with an illustrative embodiment of the present invention. This architecture depicts the hardware and software components used to startup the mobile device using either a normal boot 110 start-up mode, or an update boot 120 start-up mode. The normal boot 110 process is used in order to execute resident applications 130 (e.g. email, micro-browser, calendar, etc.) or receive and store update packages transferred as software downloads. The update boot 120 process is used for accessing, decoding, and applying one or more update packages stored within the client device NAND flash memory.

A download agent 140 component, available after the normal boot 110 process completes, provides client side functionalities to receive one or more update packages, transferred over-the-air from a remote server, to the mobile device.

Additionally, the download agent 140 component accesses functionality provided by the resident operating system (e.g. Symbian OS) to store the update package in NAND flash memory hardware 150. Depiction of the operating system functions accessed by the download agent 140 component to store an update package is not essential to the understanding of the present invention by one skilled in the art.

Rebooting the device enables access to the update agent 160. An update agent 160 component, available after the update boot 120 process completes, provides functionalities to access and decode the update package stored by the download agent 140 and apply the update instructions decoded from the update package to the firmware image stored in flash memory, thus converting an original image into a new image. A typical embodiment of the present invention realizes the update agent 160 in a small application program capable of running over the operating system core only.

Figure 2:
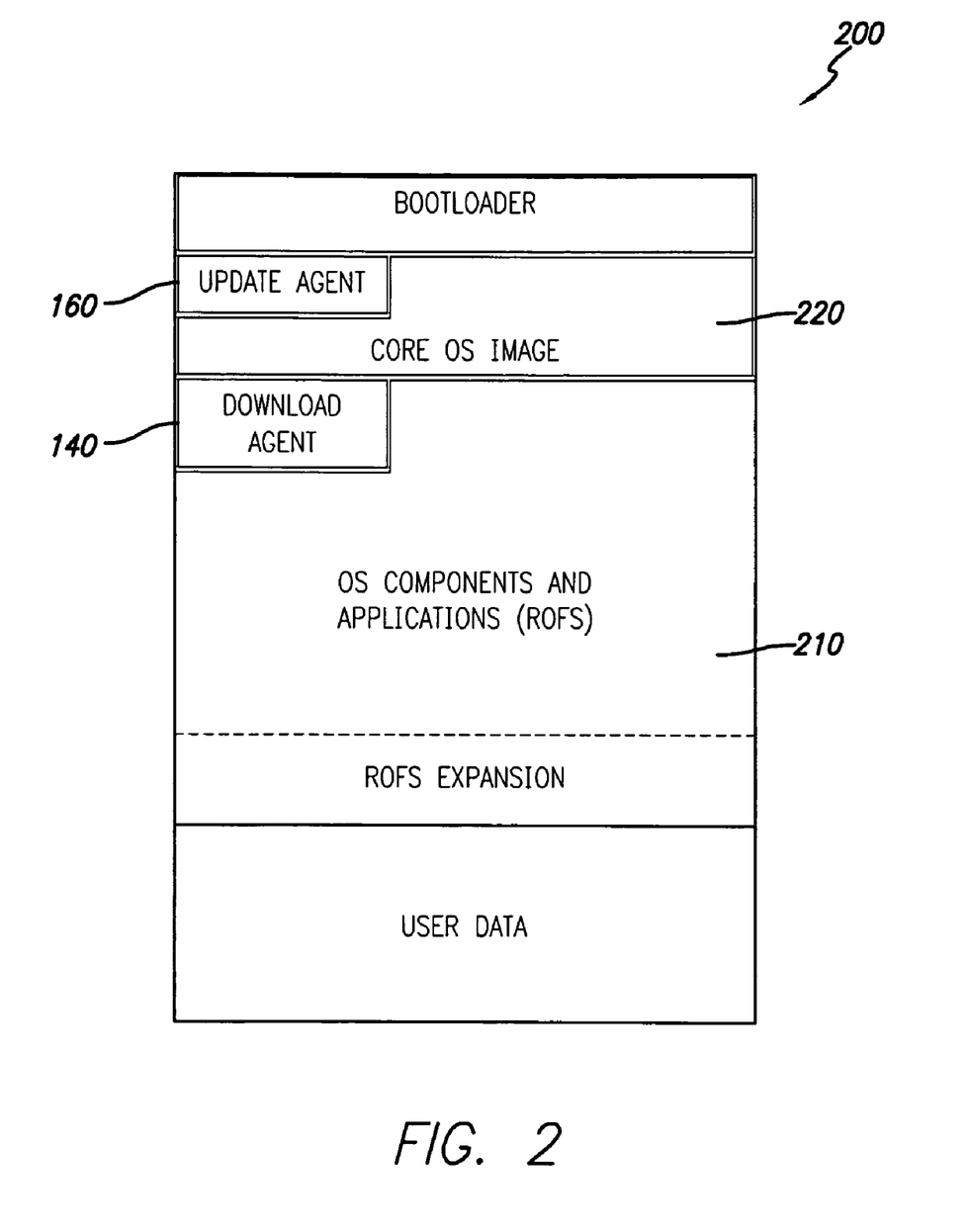
FIG. 2 is a schematic illustration of a memory map of the preferred embodiment of the present invention.

FIG. 2 shows a memory map 200 for a client device relating the memory locations of the download agent 140 and the update agent 160 in accordance with the preferred embodiment of the invention. The download agent 140 is located in the read-only file system as shown in FIG. 2. The update agent is located within the core operating system image as shown in FIG. 2. The read-only file system (ROFS), comprising the non-core operating system components and software applications ROFS 210, is managed as a single image. This image may be updated by applying an update package created by running a binary differencing engine on an original image, as currently stored in the client device, and a new image representing the new file system. This described method relates to updating the ROFS 210 image within the memory map 200. One skilled in the art should understand the method of using a binary differencing engine to create an update package containing the instructions relating how an original image is modified to create a new image. This method of updating the entire image exhibits several advantages over a file-by-file approach. These advantages include:

1. The read only file system is likely to be created by a host-based tool and is not designed to allow update of individual files;
2. Updating it as an image requires no knowledge of the file system format, and is independent of any future changes that might be made to that format;
3. OS updates are likely to be issued as fully tested images, not as individual files. The images used for OTA update can be the same as the images supplied to service centers for cable based re-flashing;
4. No management of inter-file dependencies is required, and an update that changes multiple files is guaranteed to be atomic.

In a further embodiment of the present invention, the core operating system image 220 may be updated, since the operating system executes from RAM and does not access the core operating system image in flash at anytime after normal boot 110 (i.e. startup). To update the core operating system image 220, first a backup copy of the core operating system 220 image must be created. In the event of a client device power failure occurring during the update processing, the backup copy may be loaded instead of the normal core image. Thus, in a manner similar to that described for updating the ROFS 210, the method of updating the core operating system 220 may be achieved by applying an update package representing the differences between the original core operating system image and a new image. The method of creating a backup copy requires sufficient spare flash memory to be available to store the backup copy. The depiction of creating a backup copy within is not shown in FIG. 2 and is not essential to the understanding of the present invention by one skilled in the art.

Figure 3:
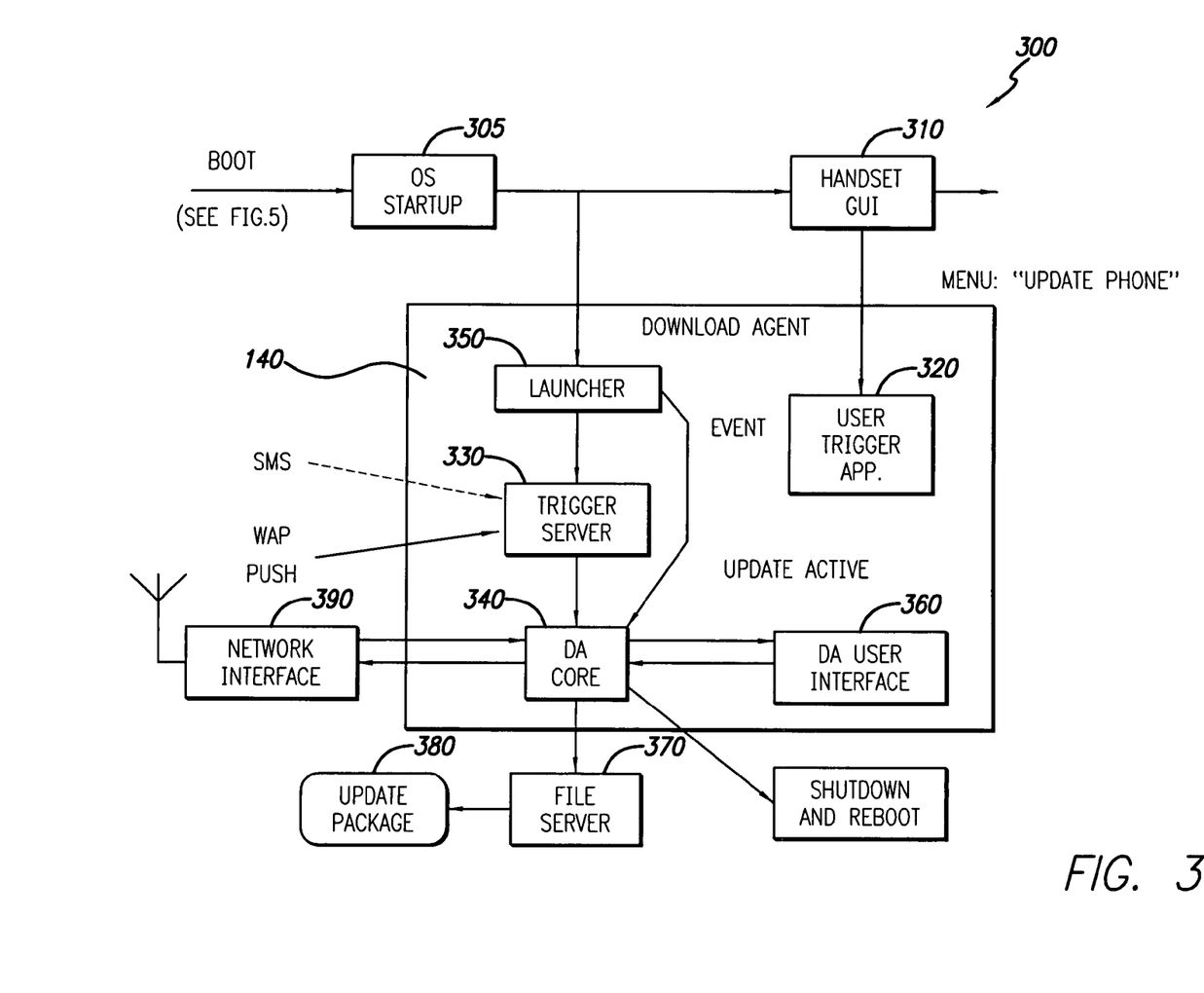
FIG. 3 is a block diagram illustrating a download agent architecture.

FIG. 3 is a block diagram that shows a download agent architecture 300 relating the principle architectural components involved in downloading an update package to a client device according to the preferred embodiment of the invention. The download agent 140 provides communication functionalities between the client device and the remote server storing a copy of the update package ready for distribution. In addition, the download agent 140 is responsible for storing the transferred update package in flash memory. In one embodiment of the present invention, the user of the client device may trigger the download update package processing by selecting this feature using the handset graphical user interface (GUI) 310 in the case of a mobile phone. When the user trigger application 320 receives an "update phone" command from the handset GUI 310 it sends an event that is received by the trigger server 330, which in turn launches the download agent core 340. Alternatively, the trigger server 330 may receive trigger messages communicated by a remote server using a Short Message Service or Wireless Application Protocol. The trigger server 330 component runs continuously, available to receive and act on all trigger events, regardless of origination. When the trigger server 330 detects a trigger event, the message is added to a queue maintained by the trigger server 330 and the download agent core 340 is started. The download agent core 340 connects to the trigger server 330 and fetches the message from the queue and processes it.

The trigger server 330 is started by a launcher component 350, which executes automatically after the operating system startup 305, bootstrapping the client device in the normal boot 110 mode. If the launcher component 350 determines that an update is active, it starts the download agent core 340 immediately. The download agent core 340 interfaces with the file server 370 to store the received update package 380 transferred from the server. In addition, the download agent core 340 is able to notify the server of the status of the active update, by sending either a success of failure message back to the remote server via a network interface 390. This mechanism enables the download agent to restart an interrupted download (e.g. loss of power) once the client device is reactivated.

In a further embodiment of the present invention, the download agent 140 provides a status message (e.g. progress bar) via the download agent user interface 360, relating the current condition of the download operation.

Figure 4:
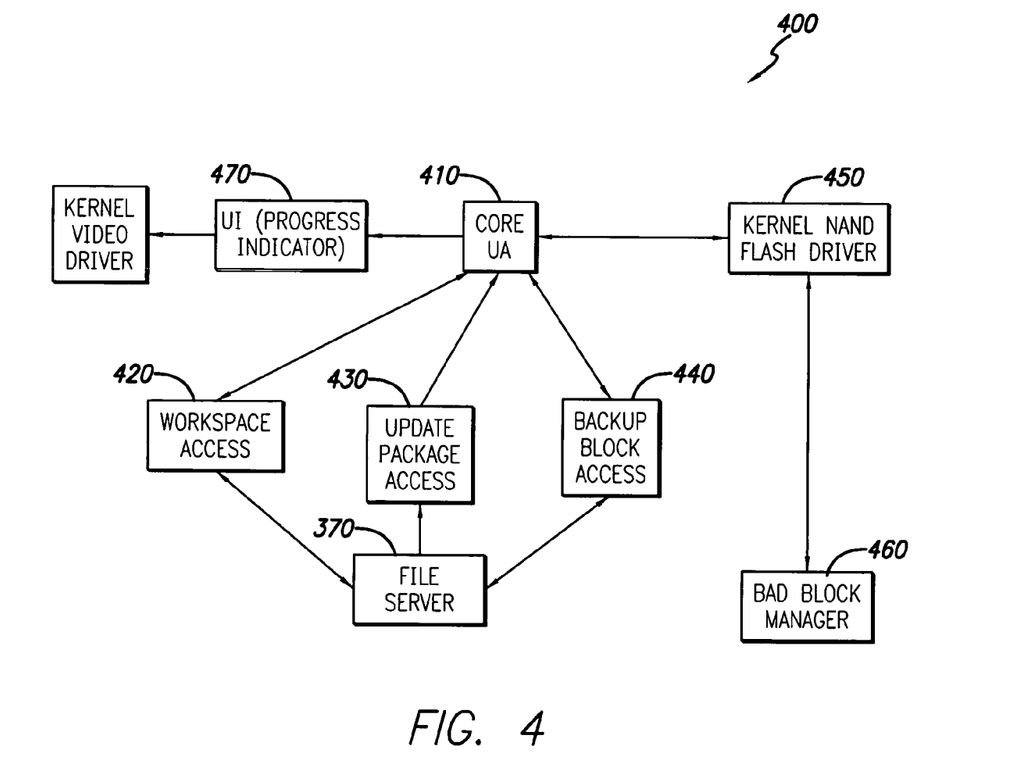
FIG. 4 is a block diagram illustrating an update agent architecture.

FIG. 4 is a block diagram that shows an update agent architecture 400 relating the principle architectural components involved in accessing, decoding, and applying an update package, stored via the file server 370 by the download agent 140, in a client device according to the preferred embodiment of the invention. The core update agent 410 provides the main functionality of the update agent 160. This functionality includes: verifying, decompressing, decoding, and application of the update package 380 upon the client device being restarted in the update boot 120 mode. In addition, the core update agent provides verification of the initial (i.e. original) and final (i.e. new) images and recovery processing in the event of a power failure. The workspace access 420, update package access 430, and backup block access 440 components are used to read or write data stored within three separate files which contain status information, the update package and a backup block, respectively, from the user file system.

Once the update package 380 is received, saved and confirmed complete, the core update agent 410 is initiated. The core update agent 410 incorporates an update decoder, not shown, and begins the cycle of applying the substantive content of update package 380 by setting or resetting an update block counter to zero (or some other predetermined value that can be meaningful used in conjunction with the counting mechanism used when encoding the update package and update instruction set).

The flash update process begins with the first block X of the k blocks to be updated according to the instruction set decoded from the update package 380. First, a copy of the Xth block of the old image is saved in the backup block file. This serves as the reference for the current image block for COPY instructions and is also essential for power fail recovery. Then, the Xth block of the new image is built in scratch memory.

Building the content of the $X^{th}$ block to be reprogrammed is comprised of ADD and COPY operations as directed by the instruction set, though it is possible that any $X^{th}$ block may constitute only a single ADD operation or single COPY operation. Once the new image content for $X^{th}$ block is complete in scratch memory, then the destination memory block X of non-volatile memory device is erased and subsequently reprogrammed with the then current content of scratch memory.

After each $X^{th}$ block has been reprogrammed with its new image content, then an update block counter is incremented and the process proceeds to determine, according to the update block counter, whether all blocks have been updated. If it is determined that still less than the complete k blocks have been updated, then the update application process returns whereupon the update decoder moves to the next $X^{th}$ block +1. This process of updating continues until at this query state it is determined that the new image to be updated across the block-structured non-volatile memory has been applied to all k blocks to be updated, at which point the update process completes. In one embodiment of the present design, once the update processing is completed, the core update agent triggers mounting of the ROFS and the client device continues with normal startup of the operating system startup. The depiction of these described update processing steps are not shown in FIG. 4, however they should be obvious by one skilled in the art. One efficient approach to applying update packages to a block-structured non-volatile flash memory device is described in U.S. patent application Ser. No. 10/676,483 entitled "Efficient System and Method for Updating a Memory Device", filed Sep. 30, 2003, the disclosure of which is incorporated herein by reference. Moving on, the kernel NAND flash driver 450 is used to read and write flash memory via the bad block manager 460.

In one embodiment of the present design, a user interface 470 monitors the progress of the core update agent 410, and generates a relative indicator, such as a simple progress bar, to provide current status to the end user. The user interface 470 interfaces directly with the kernel video driver 480 to generate this indication on the client devices display. This display mechanism method is necessary since the operating system core available after the update boot 110 mode starts does not provide any GUI components (i.e. libraries). The hardware driver used to access the display (e.g. liquid crystal) is present and in the operating system core. This hardware driver provides basic frame buffer access, but no graphics or drawing primitives are available. The user interface 470 provides a progress indication by drawing the progress bar at the pixel level.

Figure 5:
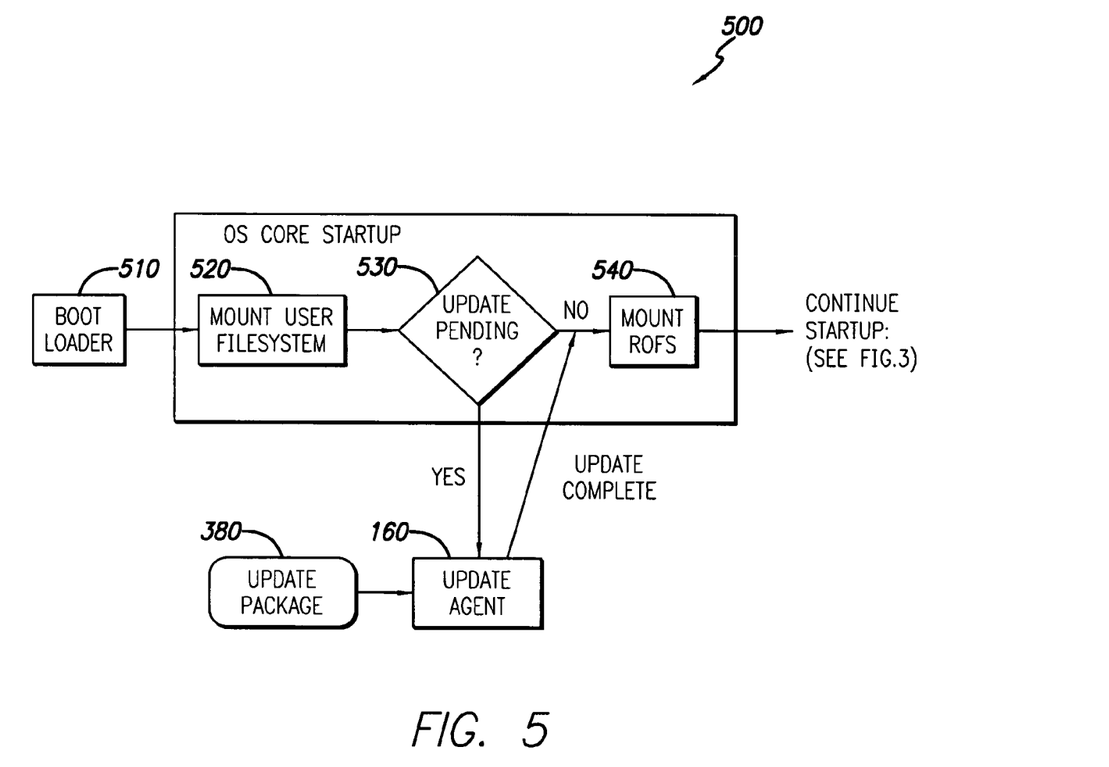
FIG. 5 is a block diagram illustrating an update agent at startup.

FIG. 5 is a block diagram that shows an update agent startup architecture 500 relating the principle architectural components involved in invoking or restarting the update agent 160 in a client device according to the preferred embodiment of the invention. The client device is started using the boot loader 510 that enables either the normal boot 110 mode or the update boot 120 mode to be entered. The boot-loader 510 executes the bootstrap code and first mounts the user file system at 520. Next, a check is made to determine if an update is pending at 530. If there is not a pending update, the ROFS is then mounted at 540 and the operating system startup continues in the normal boot 110 mode, as described previously. In the case where it is determined an update is pending at 530, the update agent 160 is launched after the user file system at 520 is mounted, and the update agent 160 accesses, decodes, and applies the update package 380. On successful termination of the update agent on completion, the updated ROFS is mounted at 540 and the operating system startup continues in the normal boot 110 mode.

The present design incorporates a fault tolerant mechanism for both the download and update processes sufficient to mitigate loss of communication signal or power failure. This mechanism enables the automatic resumption of either of these processes when the fault is restored. The depiction of which within the mobile device architecture is not essential to the understanding of the present invention by one skilled in the art.

The foregoing descriptions of specific embodiments of the present invention have been presented for the purposes of illustration and description. They are not intended to be exhaustive or to limit the invention to the precise forms disclosed, and should be understood that many modifications and variations are possible in light of the above teaching. The embodiments were chosen and described in order to best explain the principle of the invention and its practical application, to thereby enable others skilled in the art to best utilize the invention and various embodiments with various modifications as are suited to the particular use contemplated. The present invention has been described in a general client device software update environment. However, the present invention has applications to other software environments requiring remote update of non-volatile flash memory hardware devices. Therefore, it is intended that the scope of the invention be defined by the claims appended hereto and their equivalents.

What is claimed is:

1. A method for providing a firmware update of NAND flash memory, said method comprising:
   Receiving a minimal core operating system image including only those operating system components required to perform a firmware update process, including an update agent and a NAND bad block manager;
   Receiving non-core operating system components and application programs as a non-core image separate from the minimal core operating system image, wherein non-core operating system components comprise those components unnecessary to perform the firmware update process;
   Enabling the update agent to modify information in the non-core image; and
   Employing the minimal core operating system image to update firmware using the non-core image and the NAND bad block manager.

2. The method of claim 1, wherein said core operating system components and application programs are written to flash memory in a second image.

3. The method of claim 1, wherein said non-core image is provided as a read-only file system.

4. A method for updating firmware in an electronic device by way of effecting an update, said method comprising:
   a. Receiving the update package at a client device, said update package comprising a minimal core operating system image and a separate non-core image, said minimal core operating system image comprising only those components required to perform a firmware update process, including a NAND bad block manager and an update agent and said separate non-core image comprising non-core operating system components and application programs, wherein non-core operating system components comprise those components unnecessary to perform the firmware update process;
b. Storing the update package in flash memory of the client device;
c. Enabling the update agent to modify information in the non-core image; and
d. Applying said update package by employing the minimal core operating system image to update firmware using the non-core image and the NAND bad block manager.

5. The method of claim 4, wherein said non-core image is provided as a read-only file system.

6. The method of claim 4, wherein said client device employs block-structured non-volatile flash memory hardware comprising NAND technology devices employing bad block management techniques.

7. The method of claim 4, wherein said client device employs block-structured non-volatile flash memory hardware comprising NOR technology devices wherein core operating system components are stored separately from non-core operating system components.

8. The method of claim 4, wherein said update package further comprises a set of instructions relating how an original image is modified to represent a new image, created by executing a binary differencing engine on the original image, as currently stored in the client device, and the new image representing a new file system.

9. The method of claim 4, wherein said receiving further comprises managing an over-the-air communication session between a server and the client device using a download agent to interoperate with a server application storing a copy of one or more update packages ready for distribution.

10. The method of claim 4, wherein said storing further comprises a download agent writing the update package to a read-write user file system that is accessible by the update agent.

11. The method of claim 4, wherein said applying further comprises the update agent:
a. Accessing the update package stored in the client device;
b. Verifying the update package;
c. Decompressing the update package;
d. Decoding the update package; and
e. Modifying an existing image to form a new image.

12. The method of claim 4, wherein said updating firmware further comprises creating a backup copy of the core operating system image prior to applying the update package.

13. The method of claim 10, wherein said writing further comprises the download agent accessing functionalities provided by the resident operating system.

14. The method of claim 11, wherein said applying further comprises rebooting the client device to access said update agent.

15. The method of claim 11, wherein said decoding further comprises extracting the update instructions from the update package.

16. The method of claim 11, wherein said modifying further comprises effecting the decoded instruction to the firmware image stored in flash memory converting the original image to the new image.

17. The method of claim 13, wherein said download agent further comprises a trigger mechanism wherein a user of the client device or a remote server may immediately activate the download agent within the client device.

18. The method of claim 13, wherein said download agent further comprises a messaging mechanism wherein a status indicating the condition of an active update may be sent to the remote server via a network interface.

19. The method of claim 13, wherein said download agent further comprises a recovery processing mechanism to restore processing of receiving and storing the update package in the event of a failure.

20. The method of claim 13, wherein said download agent further comprises a status display via a download agent user interface relating the current condition of the download operation to the client device user.

21. The method of claim 11, wherein said update agent further comprises a recovery processing mechanism to restore processing of the update package in the event of a failure.

22. The method of claim 11, wherein said update agent further comprises execution over the core operating system.

23. The method of claim 11, wherein said update agent further comprises accessing flash and display drivers, bad block manager, and file server within the core updating system.

24. The method of claim 16, wherein said original image and new image further comprises a single image read-only file system containing a plurality of individual files.

25. The method of claim 17, wherein said download agent further comprises communications network interface for short message service or wireless application protocol to communicate said trigger.

26. The method of claim 24, wherein said single image read-only file system further comprises one or more formats.

27. The method of claim 24, wherein said update agent further comprises support independent of single image read-only file system format.

28. The method of claim 24, wherein said single image read-only file system further comprises use of a host-based tool to generate.

29. The method of claim 24, wherein said single image read-only file system further comprises a plurality of files that are all updated atomically.

30. A method for dual-mode startup of a client device to invoke an update boot mode when a pending update is available, comprising:
a. Executing bootstrap code to start a core operating system and mount a single image read-only file system comprising at least one nonessential system component;
b. Entering the update boot mode when an update is pending;
c. Enabling an update agent to modify information in the single image read-only file system; and
d. Mounting the single image read-only file system by employing a minimal core operating system image and a NAND bad block manager, said minimal core operating system image exclusively comprising operating system components necessary to perform an update process.

31. The method of claim 30, wherein said single image read-only file system further comprises at least one application program.

32. The method of claim 30, wherein said update boot mode further comprises invoking or restarting the update agent.

* * * * *